United States Patent [19]

Tani et al.

[11] Patent Number: 5,294,910
[45] Date of Patent: Mar. 15, 1994

[54] PLATINUM TEMPERATURE SENSOR

[75] Inventors: Hiroji Tani; Teppei Kubota; Tohru Kasanami; Kazuto Miyagawa, all of Kyoto, Japan

[73] Assignee: Murata Manufacturing Co., Ltd., Japan

[21] Appl. No.: 901,264

[22] Filed: Jun. 19, 1992

[30] Foreign Application Priority Data

Jul. 1, 1991 [JP] Japan .................. 3-160362
Jul. 17, 1991 [JP] Japan .................. 3-176771

[51] Int. Cl.⁵ .................. H01C 1/012; H01C 1/148
[52] U.S. Cl. .................. 338/306; 338/25; 338/313; 338/332
[58] Field of Search ............. 338/25, 332, 313, 329, 338/306

[56] References Cited

U.S. PATENT DOCUMENTS

| H498 | 7/1988 | Keller et al. | 338/329 X |
|------|--------|---------------|-----------|
| 5,041,809 | 8/1991 | Payne et al. | 338/25 |
| 5,160,912 | 11/1992 | Burke et al. | 338/332 X |

Primary Examiner—Marvin M. Lateef
Attorney, Agent, or Firm—Ostrolenk, Faber, Gerb & Soffen

[57] ABSTRACT

A platinum temperature sensor includes a meandering pattern portion and outlet portions continuously connected to respective ends thereof which are defined by a platinum film which is formed on an insulating substrate. External electrodes are formed to cover the outlet portions as well as the ends of the insulating substrate provided with the outlet portions. Each of the external electrodes comprises a first layer containing platinum or nickel which is in contact with the outlet portion and with the insulating substrate, a second layer containing silver and platinum which is formed on the first layer, a third layer containing nickel which is formed on the second layer, and a fourth layer containing tin or solder which is formed on the third layer. The first layer suppresses diffusion of silver contained in the second layer, and the third layer improves heat resistance of the second layer, while the fourth layer improves solderability.

7 Claims, 3 Drawing Sheets

PLATINUM TEMPERATURE SENSOR

BACKGROUND OF THE INVENTION

1. Field of the Invention

The present invention relates to a platinum temperature sensor comprising a platinum film which is formed on an insulating substrate, and more particularly, it relates to an improvement in an external terminal structure of such a platinum temperature sensor.

2. Description of the Background Art

A platinum temperature sensor comprises a platinum film which is formed on an insulating substrate of alumina, for example. In order to attain high resistance in a platinum temperature sensor with a small size, a platinum film is formed in a meandering pattern on an insulating substrate of a limited size, thereby increasing the line length provided by the platinum film. In order to implement such a meandering pattern, a method, advantageously employed is to form a platinum film extending entirely or substantially over the overall surface of an insulating substrate and then to form grooves in the platinum film to perpendicularly pass through the same, so that the remaining portion of the platinum film meanders along the insulating substrate.

FIG. 7 is a sectional view showing a conventional platinum temperature sensor 10 which is obtained by the aforementioned method.

The platinum temperature sensor 10 comprises an insulating substrate 1 of alumina which is 99.6 % in purity, for example. A platinum film 2 is formed on the insulating substrate 1 by printing, sputtering or vacuum deposition, and grooves 3 are formed in the platinum film 2 by application of a laser beam or by dry etching, so that the remaining portion of the platinum film 2 meaderingly extends on the insulating substrate 1. Thus, the platinum film 2 defines a meandering pattern portion 4 which serves as a resistive circuit, and outlet portions 5 continuously extending from respective ends of the meandering pattern portion 4.

The meandering pattern portion 4 is coated with a glass coating film 6 of borosilicate glass, for example. On the other hand, electrode pads 7 of gold or silver-platinum, for example, are formed on the outlet portions 5 by firing, and lead wires 8 prepared from Pt—Ni clad wires, gold wires or platinum wires, for example, are welded onto the electrode pads 7. In order to ensure fixation of the lead wires 8, glass coating films 9 are applied to cover the lead wires 8, the electrode pads 7 and the outlet portions 5.

However, the aforementioned conventional platinum temperature sensor 10 has the following problems:

Due to employment of the lead wires 8, it is necessary to handle the platinum temperature sensor 10 with the greatest possible care because of the poor tensile strength of the lead wires 8.

Due to the lead wires 8, further, such a platinum temperature sensor 10 cannot be suitably mounted on a highly integrated circuit.

SUMMARY OF THE INVENTION

Accordingly, an object of the present invention is to provide a platinum temperature sensor which can solve the aforementioned problems.

The present invention is directed to a platinum temperature sensor comprising an insulating substrate, a meandering pattern portion and outlet portions continuously connected to respective ends of the meandering pattern portion and being provided on end portions of the insulating substrate, which meandering pattern portion and outlet portions are defined by a platinum film formed on the insulating substrate, and a glass coating film formed to cover the meandering pattern portion. In order to solve the aforementioned technical problems, the inventive platinum temperature sensor further comprises external electrodes which are formed to cover the outlet portions and the end portions, of the insulating substrate provided with the outlet portions.

The inventive platinum temperature sensor requires no lead wires, since the external electrodes serve as external terminal means.

According to the present invention, therefore, it is possible to avoid the problem regarding the poor tensile strength of such lead wires.

Further, the inventive platinum temperature sensor can be surface-mounted on a circuit substrate by means of the external electrodes, whereby the present invention can advantageously be mounted on a highly integrated circuit.

Each of the external electrodes preferably comprises a first layer containing silver, a second layer containing nickel which is formed on the first layer, and a third layer containing tin or solder which is formed on the second layer.

Further, preferably, each of the external electrodes comprises a first layer containing platinum or nickel which is in contact with each outlet portion and the insulating substrate, a second layer containing silver and platinum which is formed on the first layer, a third layer containing nickel which is formed on the second layer, and a fourth layer containing tin or solder which is formed on the third layer.

In the layers forming each of such multilayered external electrodes, the first layer containing platinum or nickel protects the platinum film against diffusion of silver which is contained in the second layer containing silver and platinum. The third layer containing nickel improves heat resistance of the second layer against soldering. Further, the fourth layer containing tin or solder improves solderability.

According to the preferred embodiment of the present invention, therefore, it is possible to suppress diffusion of silver contained in the second layer by means of the first layer, whereby the platinum temperature sensor can be protected from deterioration of its TCR characteristics, which may be caused by silver.

Further, the third layer improves the heat resistance of the second layer against soldering, thereby advantageously preventing solder leaching.

In addition, each external electrode is improved in solderability by the fourth layer, whereby it is further possible for the platinum temperature sensor to advantageously be mounted on a highly integrated circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
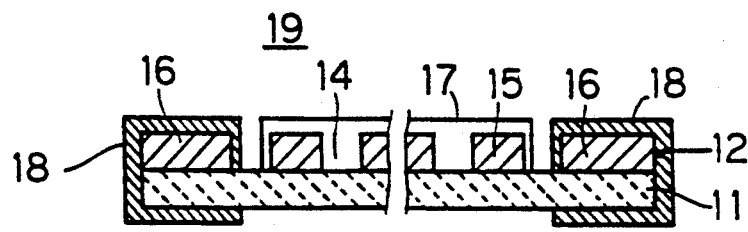
FIG. 1 is a sectional view showing a platinum temperature sensor 19 according to an embodiment of the present invention.

FIG. 1 is a sectional view showing a platinum temperature sensor 19 according to an embodiment of the present invention. A method of manufacturing the platinum temperature sensor 19 is now described with reference to FIGS. 2(a) to 2(d), in order to clarify the structure of the platinum temperature sensor 19.

Figure 2A:
FIGS. 2(a) to 2(d) are sectional views illustrating respective steps included in a method of manufacturing the platinum temperature sensor 19 shown in FIG. 1.

First, an insulating substrate 11 of alumina which is 99.6% in purity, for example, is prepared as shown in FIG. 2(a). A platinum film 12 is formed on this insulating substrate 11 by printing, sputtering or vacuum deposition, for example. This platinum film 12 is 1.4 to 2.0 μm in thickness, for example.

Figure 2B:
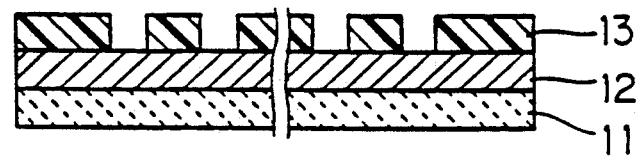

Then, a resist film 13 is formed on the platinum film 12, and patterned by photolithography, as shown in FIG. 2(b).

Figure 2C:
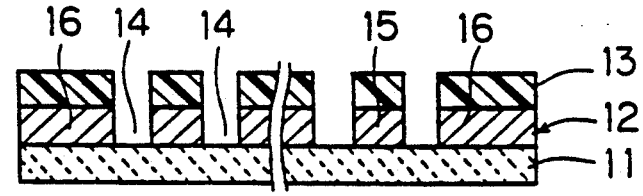

Then, the patterned resist film 13 is used as a mask to finely work the platinum film 12 by $Ar^+$ ion etching as shown in FIG. 2(c). Such an $Ar^+$ ion etching step is carried out under an atmosphere of 100% argon in a vacuum of $10^{-4}$ Torr, with ion energy of 500 to 600 eV at room temperature for 30 to 40 minutes, for example. Thus, grooves 14 are formed in correspondence to the patterns of the resist film 13, perpendicularly passing through the platinum film 12. Consequently, the platinum film 12 is worked so as to define a meandering pattern portion 15 and outlet portions 16 which are continuously connected to respective ends of the meandering pattern portion 15.

Figure 2D:
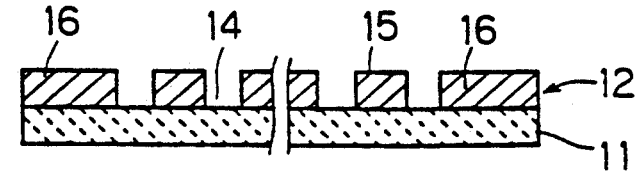
Figure 3:
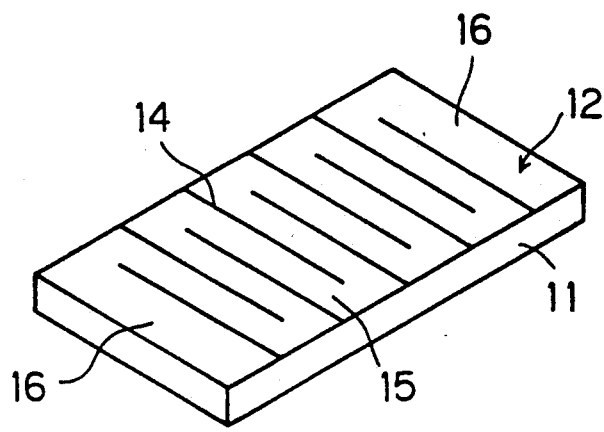
FIG. 3 is a perspective view showing a structure obtained in the step shown in FIG. 2(d)

Then, the resist film 13 is removed as shown in FIG. 2(d). FIG. 3 is a perspective view showing a structure obtained in this step. It is understood from FIG. 3 that the platinum film 12 which is provided on the insulating substrate 11 defines the meandering pattern portion 15 and the outlet portions 16 due to the grooves 14 formed therein.

By use of the aforementioned $Ar^+$ ion etching, it is possible to form the grooves 14 at extremely small intervals, thereby narrowing the line width of the meandering pattern portion 15. Thus, it is possible to derive a resistive circuit capable of providing a high resistance value from a platinum film 12 which is limited in area, whereby the platinum temperature sensor 19 can be miniaturized while ensuring a resistance value in excess of a desired value. If such an advantage is not desired, however, the grooves 14 may alternatively be formed by another dry etching process, or with a laser beam.

After the grooves 14 are formed, trimming may be carried out with a laser beam, for example, in order to adjust the resistance value which is provided by the meandering pattern portion 15.

Then, a glass coating film 17 of borosilicate glass, for example, is formed to cover the meandering pattern portion 15, as shown in FIG. 1. Further, external electrodes 18 are formed to cover the outlet portions 16 and the end portions of the insulating substrate 11 provided with the outlet portions 16. The external electrodes 18, which are made of a metal such as Ag, Ag—Pt, Ag—Pd or Au, for example, are formed by dipping the end portions of the insulating substrate 11 in paste containing a desired metal and baking the same. Thus, the external electrodes 18 are formed to extend not only along the outlet portions 16 but also toward the lower surface of the insulating substrate 11.

According to the platinum temperature sensor 19 obtained in the aforementioned manner, it is possible to attain electrical continuity to the exterior on the end surfaces and the lower surfaces of the insulating substrate 11 through the external electrodes 18. Such external electrodes 18 can be directly soldered onto a circuit substrate, in order to mount the platinum temperature sensor 19 thereon. Thus, it is possible to increase the degree of integration of the circuit. Further, such a surface-mountable platinum temperature sensor 19 can be easily introduced into an air flow sensor, for example.

Figure 4:
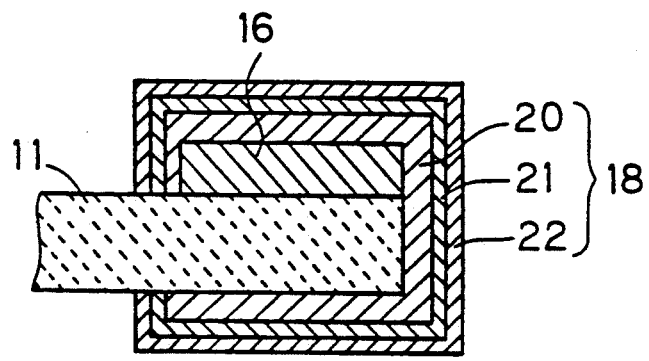
FIG. 4 is a sectional view showing a part of a platinum temperature sensor according to another embodiment of the present invention.

FIG. 4 is a sectional view partially illustrating a platinum temperature sensor according to another embodiment of the present invention in an enlarged manner. FIG. 4 shows an end portion of an insulating substrate 11.

According to this embodiment, each of the external electrodes 18, which are formed to cover end portions of the insulating substrate 11 as well as outlet portions 16, has a three-layer structure. According to this embodiment, in particular, a first layer 20 is made of a material which contains silver, such as Ag, Ag—Pt or Ag—Pd. A second layer 21 containing nickel is formed on the first layer 20, in order to improve heat resistance against soldering. The second layer 21 is provided by an electroplating layer of nickel, for example. In order to improve solderability of the second layer 21, a third layer 22 containing Sn (tin) or Pb—Sn (solder) is formed on the second layer 21. The third layer 22 is provided by an Sn plating layer or a Pb-Sn plating layer, for example.

Figure 5:
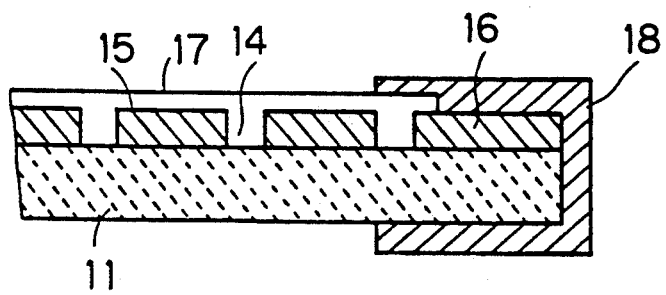
FIG. 5 is a sectional view showing a part of a platinum temperature sensor according to still another embodiment of the present invention.

FIG. 5 is a sectional view partially illustrating a platinum temperature sensor according to still another embodiment of the present invention in an enlarged manner. FIG. 5 shows an end portion of an insulating substrate 11.

A glass coating film 17 which is formed to cover a meandering pattern portion 15 also covers a part of each outlet portion 16. The glass coating film 17, which is made of borosilicate glass, is formed by baking the material at 900° C. for 10 to 20 minutes, for example. Each external electrode 18 is formed to slightly cover each edge of the glass coating film 17. The external electrode 18 is formed by dipping each end of the substrate 11 in silver paste, for example, and baking the same at 850° C. for 30 minutes.

The external electrode 18 is overlapped on the glass coating film 17 as described above, thereby entirely sealing the platinum film 12 which is formed on the insulating substrate 11 so that the same is not exposed to the exterior.

Figure 6:
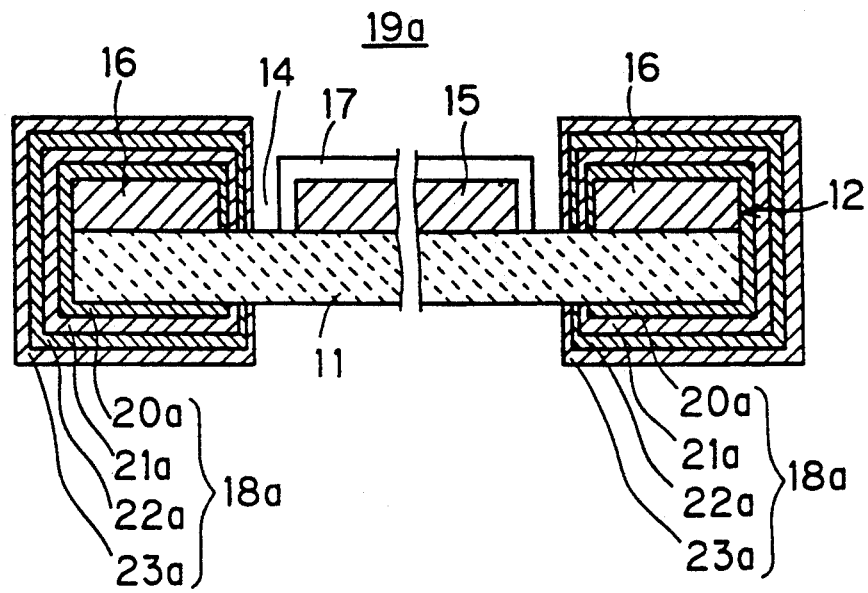
FIG. 6 is a sectional view showing a platinum temperature sensor 19a according to a further embodiment of the present invention.
Figure 7:
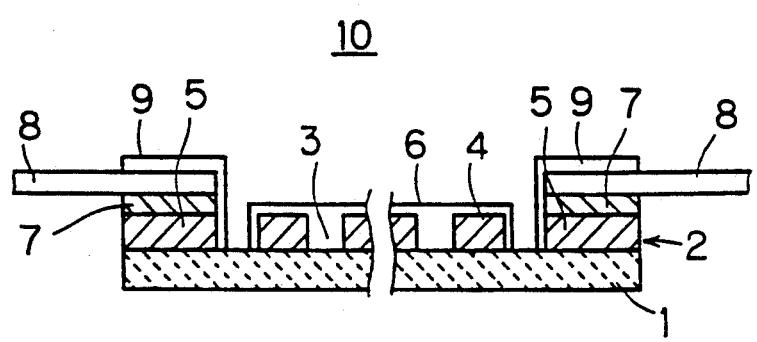
FIG. 7 is a sectional view showing a conventional platinum temperature sensor 10.

FIG. 6 is a sectional view showing a platinum temperature sensor 19a according to a further embodiment of the present invention. Referring to FIG. 6, elements corresponding to those shown in FIG. 1 are denoted by the same reference numerals, to omit redundant description.

Each of the external electrodes 18a comprises a first layer 20a, a second layer 21a, a third layer 22a and a fourth layer 23a.

The first layer 20a, which is brought into contact with each outlet portion 16 and an insulating substrate 11, contains platinum or nickel. Such a first layer 20a is formed by dipping each end of the insulating substrate 11 in paste containing platinum or nickel and baking the same, for example. In this case, a temperature of 800° C., for example, is applied to bake the first layer 20a in the air when the paste contains platinum or in nitrogen when the same contains nickel. The first layer 20a may alternatively formed by plating.

The second layer 21a, which contains silver and platinum, is formed on the first layer 20a. The second layer 21a is formed by dipping each end of the insulating substrate 11, which is already provided with the first layer 20a, in paste containing silver and platinum and baking the same, for example.

The third layer 22a, which contains nickel, is formed on the second layer 21a. The third layer 22a is provided by an electroplating layer of nickel, for example.

Further, the fourth layer 23a, which contains tin or solder, is formed on the third layer 22a. The fourth layer 23a is provided by a tin plating layer or a solder plating layer, for example.

Although the present invention has been described and illustrated in detail, it is clearly understood that the description of embodiments of the invention is by way of illustration and example only and is not to be taken by way of limitation, the spirit and scope of the present invention being limited only by the terms of the appended claims.

What is claimed is:

1. A platinum temperature sensor comprising:
   an insulating substrate;
   a meandering pattern portion, and outlet portions which are continuously connected to respective ends of said meandering pattern portion, provided on end portions of said insulating substrate, said meandering pattern portion and said outlet portions being defined by a platinum film formed on said insulating substrate; and
   external electrodes formed to cover at least parts of said outlet portions and at least parts of said end portions of said insulating substrate which are provided with said outlet portions, wherein each of said external electrodes comprises a first layer, which is made of a metal that contains silver, in contact with said outlet portion, a second layer containing nickel formed on said first layer, and a third layer containing tin or solder formed on said second layer.

2. A platinum temperature sensor in accordance with claim 1, wherein said meandering pattern portion and said outlet portions are obtained by forming a patterned resist film on a platinum film and carrying out Ar+ ion etching on said platinum film using said resist film as a mask.

3. A platinum temperature sensor in accordance with claim 1, further comprising a glass coating film which is formed to cover both said meandering pattern portion and parts of said outlet portions, and said external electrodes are further formed so as to cover parts of said glass coating film.

4. A platinum temperature sensor in accordance with claim 1, wherein said first layer contains a metal selected from the group consisting of Ag, Ag—Pt and Ag—Pd.

5. A platinum temperature sensor comprising:
   an insulating substrate;
   a meandering pattern portion, and outlet portions which are continuously connected to respective ends of said meandering pattern portion, provided on end portions of said insulating substrate, said meandering pattern portion and said outlet portions being defined by a platinum film formed on said insulating substrate; and
   external electrodes formed to cover at least parts of said outlet portions and at least parts of said end portions of said insulating substrate which are provided with said outlet portions, wherein each of said external electrodes comprises a first layer on said outlet portion containing platinum or nickel in contact with each said outlet portion, a second layer containing silver and platinum formed on said first layer, a third layer containing nickel formed on said second layer, and a fourth layer containing tin or solder formed on said third layer.

6. A platinum temperature sensor in accordance with claim 5, wherein said meandering pattern portion and said outlet portions are obtained by forming a patterned resist film on a platinum film and carrying out Ar+ ion etching on said platinum film using said resist film as a mask.

7. A platinum temperature sensor in accordance with claim 5, further comprising a glass coating film which is formed to cover both said meandering pattern portion and parts of said outlet portions, and said external electrodes are further formed so as to cover parts of said glass coating film.

* * * * *